United States Patent [19]

Magnani et al.

[11] Patent Number: 4,703,135
[45] Date of Patent: Oct. 27, 1987

[54] ARTICULATED CABLE BEND LIMITING APPARATUS

[75] Inventors: Francesco Magnani, Pavia; Attilio Invernizzi, Milan, both of Italy

[73] Assignee: Societa' Cavi Pirelli S.p.A., Milan, Italy

[21] Appl. No.: 943,620

[22] Filed: Dec. 18, 1986

[30] Foreign Application Priority Data

Dec. 20, 1985 [IT] Italy .............................. 23316 A/85

[51] Int. Cl.⁴ .................... H01R 13/56; H02G 15/007
[52] U.S. Cl. ..................................... 174/135; 138/120; 174/705; 285/223; 285/405
[58] Field of Search ................. 174/68 C, 70 R, 70 S, 174/135, 136; 138/120, 155; 285/163, 166, 223, 405; 339/101

[56] References Cited

U.S. PATENT DOCUMENTS 1,822,624  9/1931  Hoeftmann ..................... 138/120 X
3,813,477  5/1974  Fischer ........................... 138/120 X

FOREIGN PATENT DOCUMENTS 2142788  1/1985  United Kingdom ................ 339/101

Primary Examiner—Laramie E. Askin
Attorney, Agent, or Firm—Brooks Haidt Haffner & Delahunty

[57] ABSTRACT

A device for limiting the bending radius of a submarine cable portion. The device is composed of a plurality of turbular elements (5) connected to one another in an articulated manner. Each element (5) is formed by a tubular cylindrical body (10) having two end flanges (12, 13) provided with circumferential through-holes (21, 31) for the passage of connecting members (4). One flange (12) has semi-spherical projecting members (28) in diametrically opposed positions with respect to each through-hole (21). The other flange (13) has complementary semi-spherical projecting members (28).

7 Claims, 4 Drawing Figures

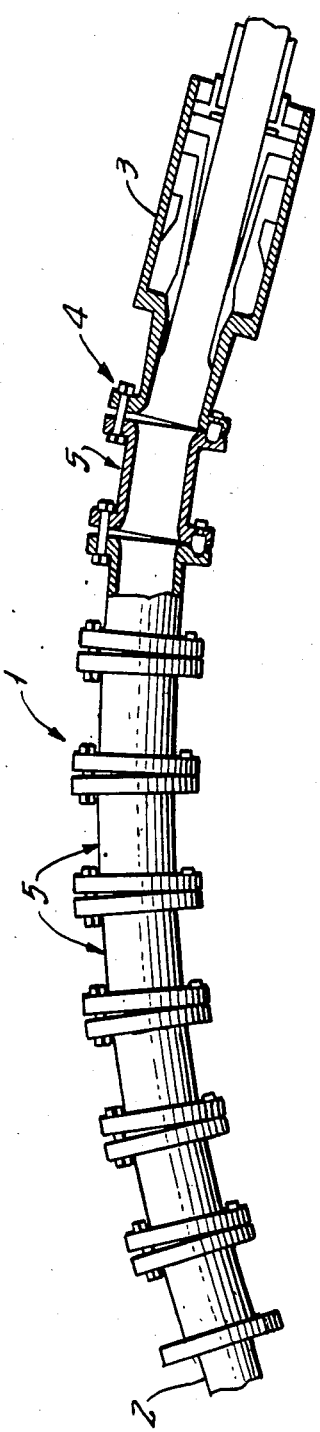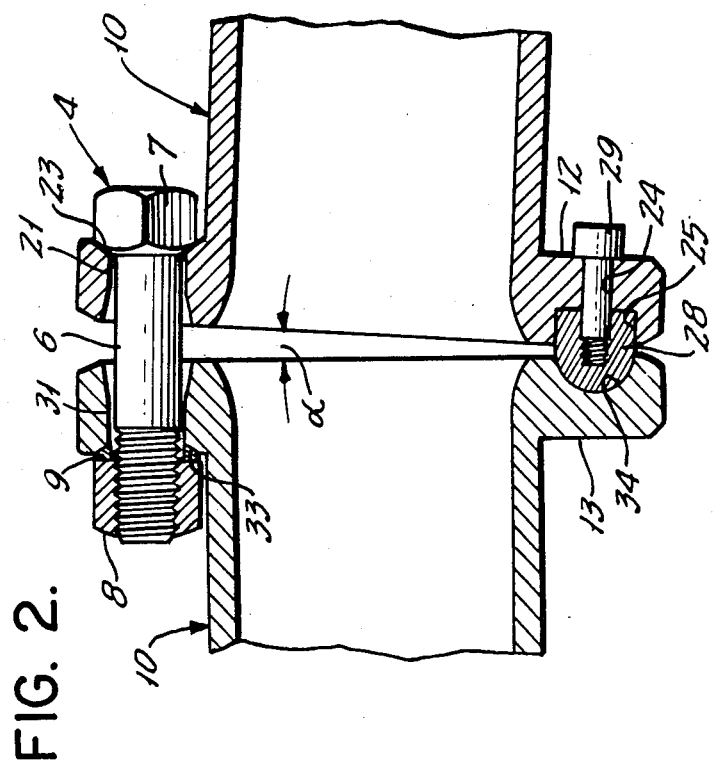
FIG. 1.
FIG. 2.

ARTICULATED CABLE BEND LIMITING APPARATUS

The present invention relates to a device for limiting the bending radius of a submarine cable portion, particularly, but not exclusively, in correspondence of abrupt variations in the mechanical rigidity of the cable.

The invention finds application in submarine power cables and in telecommunication cables both of the conventional type and of the type containing optical fibers.

Such cables have abrupt variations in their mechanical rigidity, at portions corresponding to repeaters, joints, external reinforcing structures, etc., which could overstress the cable portions adjacent to the more rigid section, by forcing them to undergo bending at very small radius. Such bending can occur during the partial winding and unwinding operations, prior to and during the laying of the cable, and can occur during the forming of an already laid cable.

Stresses of an analogous type can be found even on the laid cable when the cable is not supported in a continuous manner.

There already exist known limiting devices which are made of annular segments which are joined together by screws or bolts for forming a tube.

The screws traverse the annular bodies at positions not far from the axis of each and they are housed in seats which extend angularly with respect to the axis of the body to allow a limited possibility of pivoting.

During the pivoting between two adjacent annular bodies, one screw acts as a tie-rod, whereas the head of the diametrically opposed one can enter the angled seat until the annular bodies abut at the inner parts of the curve of a bend.

Devices of such a kind are unsatisfactory because the bending and compressive stresses, applied to the screws, are very concentrated and, therefore, the angles of pivoting between the adjacent elements are not easily controllable. In some areas, the annular bodies contact one another, during bending, with the possibility of creep between the parts.

One object of the present invention is to provide a device for limiting the bending radius of a submarine cable portion which is simple to install and to put into operation and which also has a uniform distribution of the compressive stresses during the reciprocal pivoting of the elements constituting the device.

In accordance with the invention, the device for limiting the bending radius of a submarine cable portion comprises a plurality of elements, connected to one another and permitted a limited reciprocal pivoting, characterized by the fact that each one of said elements comprises a tubular body and two end flanges provided with circumferential through-holes for the passage of connecting members, each one of which comprises a cylindrical shaft having ends of a greater cross-section than the cross-section of the shaft. On one flange, a semi-spherical projecting member is provided in a diametrically opposed position with respect to each through-hole. On the other flange, a semi-spherical seat is provided for receiving said projecting member.

Other objects and advantages of the present invention will be apparent from the following detailed description of the presently preferred embodiments thereof, which description should be considered in conjunction with the accompanying drawings in which:

FIG. 1 is a side elevation view, partly in cross-section, of a cable with a limiting device according to the invention;

FIG. 2 is an enlarged cross-sectional view of a pair of limiting tubular elements shown in FIG. 1.

Figure 3:
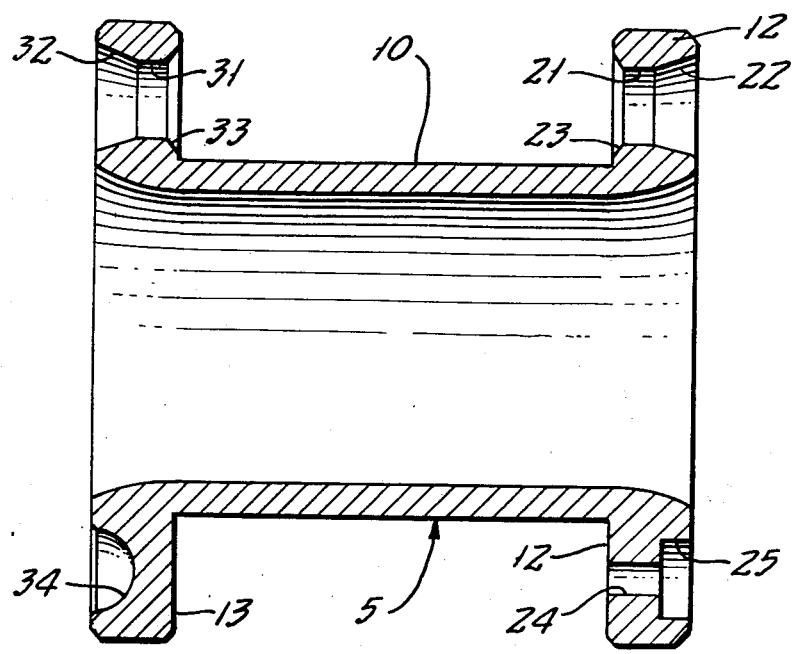
FIGS. 3 and 4 respectively show a longitudinal section and a front view of one of the tubular elements forming the device for limiting the bending radius.

In FIG. 1, the device 1 for limiting the bending radius according to the invention is shown as applied to a submarine cable portion 2, adjacent to a cylindrical casing 3 which houses, for example, a joint.

The limiting device 1 according to the invention is formed by a plurality of tubular elements 5 connected to one another, in an articulated manner, and to one end of the casing 3 which has the shape of one end of a tubular element 5. An analogous limiting device can also be provided at the other end of the cylindrical casing 3.

The tubular elements 5 are rigid (made of metal, for example), and each has the same length. Moreover, they are utilized in a number that is sufficient for realizing the length for which bending control is desired.

Figure 4:
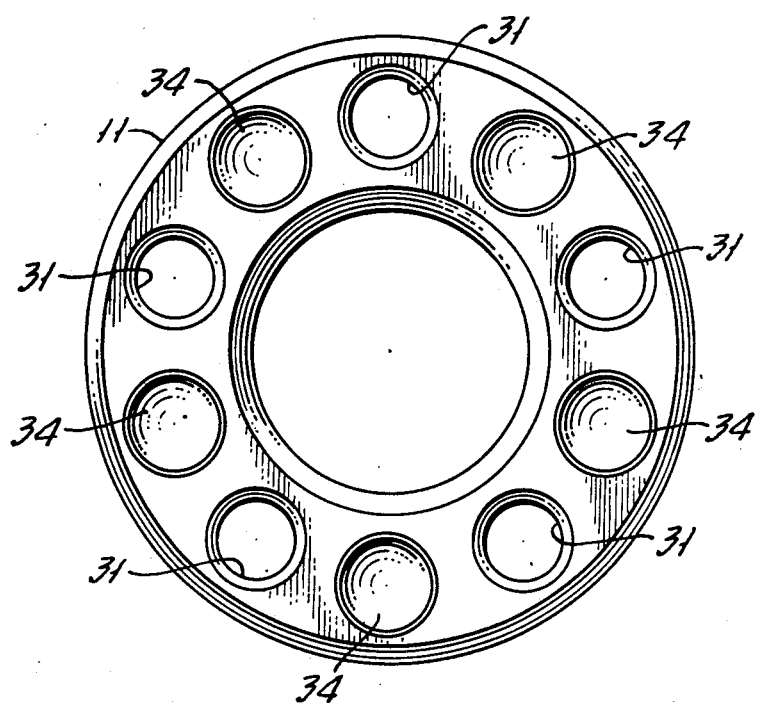

With reference to FIGS. 3 and 4, the structure of one of the elements 5 will now be described.

Each element 5 is formed by a tubular cylindrical body 10 having an inner diameter greater than the outer diameter of the cable over which it is to be applied and by two end flanges 12 and 13 respectively.

As can be seen in FIG. 4, the flange 13 has a plurality of holes 31, distributed circumferentially, and an equal number of seats 34 in the form of semi-spherical recesses, diametrically opposed to the holes 31, the holes 31 alternating with the seats 34.

Each hole 31 is countersunk from both sides of the flange 13 at the portions 32 and 33. The countersunk portion 32 is longer than the countersunk portion 33 which is at the side of the flange 13 nearest the body 10.

The flange 12 has holes 21 axially aligned with the holes 31 and having an equal diameter, the holes 21 being similarly provided with analogous countersunk portions 22 and 23 of which 22 is longer than 23.

In the diametrically opposed position to each hole 21 and, therefore, aligned with seat 34 of flange 13, the flange 12 has a hole 24 and a cylindrical seat 25 coaxial with the hole 24 and forming an extension of the hole 24 on the side of the flange 12 remote from the body 10.

With reference to FIG. 2, there will now be described the connection between two adjacent tubular elements 5.

In FIG. 2, the connecting members between two adjacent tubular elements are formed by bolts 4 which extend through the aligned holes 21 and 31 of two adjacent flanges 12 and 13.

The bolt head 7, which preferably is rounded, or flanged, on the side facing the bolt body 6, abuts the countersunk portion 23 of the corresponding flange 12, while at the other end, a nut 8 is turned onto the threaded end of the bolt 4 and, preferably, semi-spherical washer 9 is intermediate the nut 8 and the portion that abuts the corresponding countersunk portion 33 of the hole 31.

The bolt 4, comprising the head 7, the nut 8 and the washer 9, forms the connecting member, the bolt body 6 forming a shaft, whereas the ends of the greater cross-section are formed, in this instance, respectively, by the head 7 and by the nut 8 (or if present, together with washer 9).

The connecting member could even be realized in different ways, such as, for example, with a shaft threaded at both ends and two nuts (with or without washers), forming end portions having a greater cross-section.

The inner diameters of the holes 21 and 31 are greater than the diameter of the bolt body or shaft 6. Also, the shaft 6 has a greater length than the total thickness of the two flanges 12 and 13, so that two adjacent flanges 12 and 13 are not put in contact with each other when the nut 8 is applied.

In the embodiment shown, wherein the connecting member is formed by a bolt 6 and a nut 8, the nut 8 will be screwed onto the threaded portion of the bolt 4 in such a way that the two flanges 12 and 13 are not in contact.

The flange 12 receives, in each cylindrical seat 25, a projecting member 28 having a semi-spherical end, the projecting member being fixed to the flange 12 by means of the screw 29 which has a threaded end received in a threaded hole in the projecting member.

The semi-spherical end of the projecting member abuts the seat 34, and although these two elements (28 and 34) are not connecting means between the tubular bodies 5, such elements form part of the articulated joint and keep the two flanges 12 and 13 spaced apart since the projecting member 28 protrudes from the flange 12 for a length greater than the depth of the complementary shaped seat 34.

The projecting member 28 secured to the flange 12 and the seat 34 on the flange 13 constitute an articulated joint diametrically opposed to each connecting member which is formed by the bolts 4 passing through the holes 31 and 21, in the flanges 12 and 13, and permits a limited pivoting of one body 5 relative to the next body 5, the pivot angle α between the two flanges being shown in FIG. 2.

Said pivot angle is generally of a few degrees, typically 4°-5°, and it represents the maximum angular mobility permitted by the structure of the device in the diametral plane which passes through the centers of the hole-and-seat pair 31 and 34.

Therefore, the tubular elements 5 are articulated in different directions, as a function of the number of pairs of bolts articulated joints (five in the illustrated example).

Utilizing an articulated joint formed by a projecting member, by a protuberance shaped like a spherical segment and a corresponding curved seat, allows for distributing, over a considerably greater surface, the compressive stresses exercised on this component.

In the prior art, the use of a bolt or screw in place of a projecting member was disadvantageous since the bolt or screw was subjected to compressive stresses which could easily force it to yield, or to be deformed.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Apparatus for limiting the bending of a cable, said apparatus comprising:
   a plurality of rigid tubular elements having a tubular bore greater in diameter than the diameter of the cable, the bending of which is to be limited;
   each of said tubular elements having a tubular body and a pair of outwardly extending flanges, one at one end of said body and the other at the other end of said body, one of said pair of flanges having at least one through-hole extending substantially parallel to the axis of said body and having at least one semi-spherical seat diametrically opposite to said through-hole and the other of said pair of flanges having a pair of diametrically opposite through-holes extending substantially parallel to said axis of said body, one of said pair of through-holes being axially aligned with said through-hole in said one of said pair of flanges and the other of said pair of through-holes being axially aligned with said semi-spherical seat in said one of said pair of flanges;
   connecting means for extending through the axially aligned through-holes; and
   a projecting member having a semi-spherical surface secured in said other of said pair of through-holes with said semi-spherical surface thereof protruding from the face of said other of said pair of flanges which faces away from said body.

2. Apparatus as set forth in claim 1 wherein said one of said pair of flanges has a plurality of through-holes alternating with a plurality of semi-spherical seats, each of said plurality of through-holes being respectively diametrically opposite a semi-spherical seat.

3. Apparatus as set forth in claim 1 wherein said connecting means has a shaft of a diameter less than the diameter of said through-hole in said one of said pair of flanges and said one of said pair of through-holes in said other of said pair of flanges which is axially aligned with said through-hole in said one of said pair of flanges.

4. Apparatus as set forth in claim 3 wherein said connecting means has means at the ends thereof of a diameter greater than the diameter of the axially aligned through-holes and has a length between said means at the ends thereof which is greater than the combined axial thicknesses of said pair of flanges.

5. Apparatus as set forth in claim 4 wherein said connecting means is a bolt with a head and a nut, said head and said nut forming said means at the ends of said connecting means.

6. Apparatus as set forth in claim 4 further comprising a semi-spherical washer adjacent one of said head and said nut.

7. Apparatus as set forth in claim 1 wherein the axially aligned through-holes have countersunk portions.

* * * * *